Jan. 2, 1962     O. M. JOHNSON     3,015,520
TILTING BACK MECHANISM
Filed Sept. 7, 1960     2 Sheets-Sheet 2
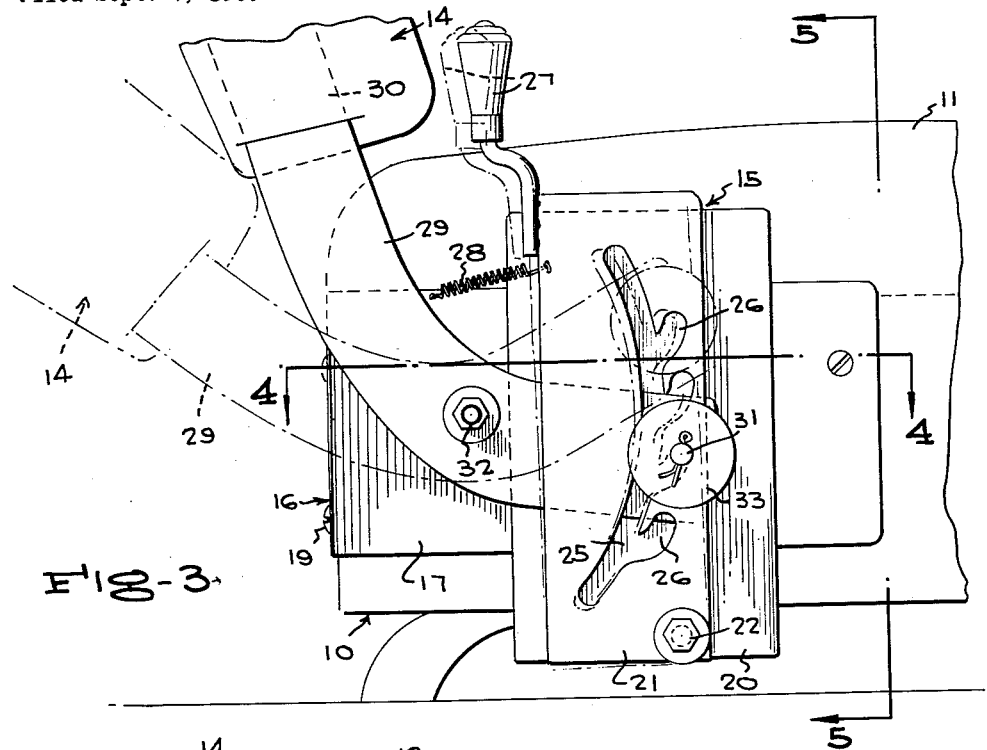
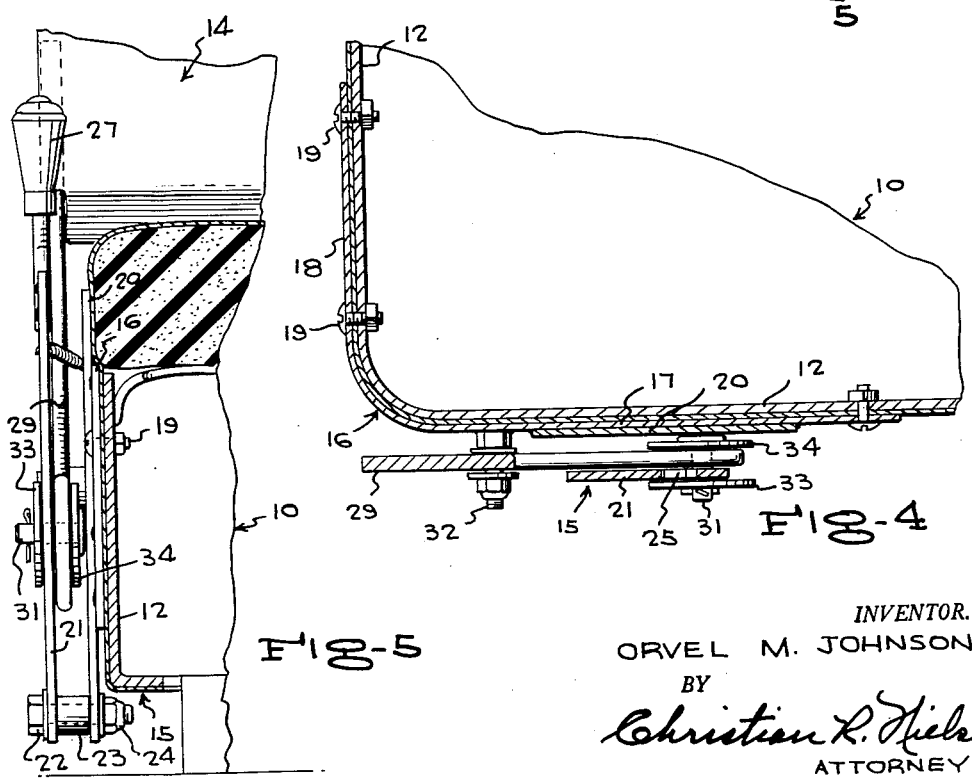
INVENTOR.
ORVEL M. JOHNSON
BY
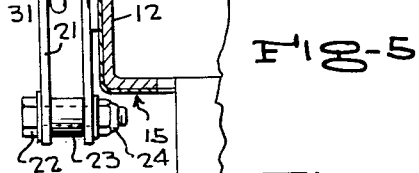
ATTORNEY under 3,015,520
Patented Jan. 2, 1962

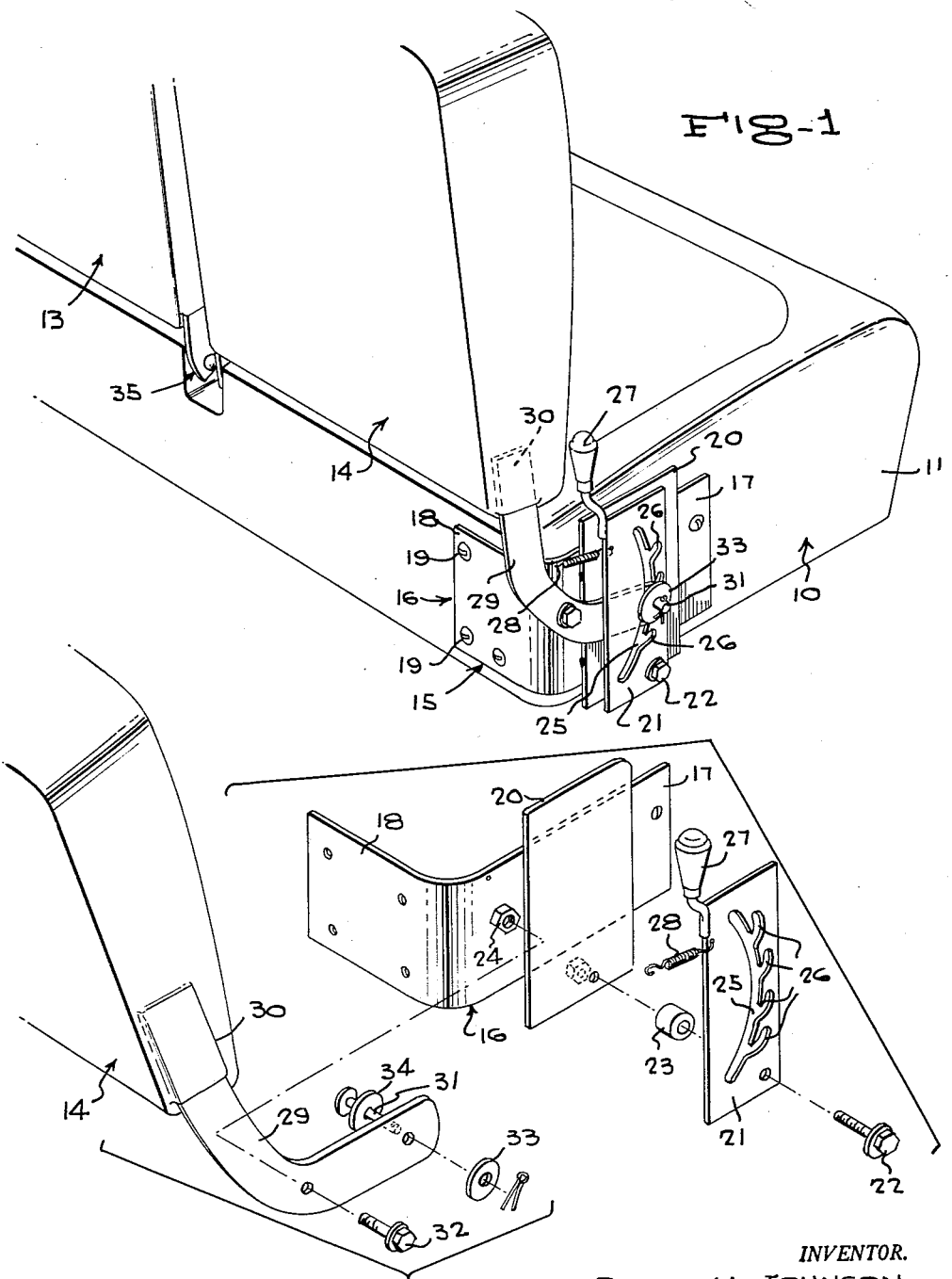

3,015,520
TILTING BACK MECHANISM
Orvel M. Johnson, 189 Sheridan Park Hill,
North Little Rock, Ark.
Filed Sept. 7, 1960, Ser. No. 54,488
1 Claim. (Cl. 297—371)

This invention relates to a seat construction, and more particularly to a seat construction for a vehicle such as an automobile.

The object of the invention is to provide a means for converting a conventional automobile split back rest seat construction to a tilting back rest arrangement so that the back rest can be arranged in different adjusted positions as desired.

Another object of the invention is to provide a tilting mechanism for a back rest of a seat such as a vehicle front seat, wherein the back rest can be arranged or positioned in a generally vertical position, a generally horizontal position, or any of a number of intermediate positions.

A still further object of the invention is to provide a tilting back mechanism for a seat construction such as a front seat construction of an automobile, and wherein according to the present invention there is provided a novel releasing and locking mechanism which serves to insure that the adjustable back rest be maintained immobile in its various adjusted positions as desired.

A further object of the invention is to provide a tilting back mechanism for a seat construction which is extremely simple and inexpensive to manufacture and install.

Other objects and advantages will be apparent during the course of the following description.

In the accompanying drawings, forming a part of this application, and in which like numerals are used to designate like parts throughout the same.

FIG. 1 is a perspective view illustrating the mechanism of the present invention.

FIG. 2 is a perspective view showing the parts separated or disassembled.

FIG. 3 is a side elevational view illustrating the present invention.

FIG. 4 is a sectional view taken on the line 4—4 of FIG. 3.

FIG. 5 is a sectional view taken on the line 5—5 of FIG. 3.

Referring in detail to the drawings, the numeral 10 indicates a portion of a conventional seat such as the front seat of an automobile or other vehicle, and the seat 10 includes a main body portion 11, FIG. 1, as well as a frame 12, and the numerals 13 and 14 indicate tilting back rests or back members which are arranged adjacent the seat 10.

According to the present invention there is provided a tilting mechanism which is indicated generally by the numeral 15, and the tilting mechanism 15 includes a bracket 16 which has a generally L-shape, so that the bracket 16 includes first and second portions 17 and 18 which are arranged generally at right angles with respect to each other, and the bracket 16 is adapted to be fastened to the seat frame 12 as for example by means of securing elements 19. The numeral 20 indicates a vertically disposed support member or plate which is secured as by welding to the portion 17 and the bracket 16.

There is further provided a plate 21 which is arranged in spaced parallel relation with respect to the support member 20, and a lower corner portion of the plate 21 is pivotally connected to a lower portion of the support member 20 by means of a bolt or securing element 22, there being a spacer member 23 mounted on the securing element 22, and the spacer member 23 is interposed between the plate 21 and the support member 20, and the securing element 22 is adapted to engage a fastener such as the nut 24, FIG. 2. As shown in the drawings the plate 21 is provided with an arcuate or curved slot 25 therein, and there is also provided in the plate 21 a plurality of notches 26 which communicate with the slot 25 for a purpose to be later described.

The numeral 27 indicates a handle or lever which is secured as by welding to a portion of the plate 21. There is further provided a resilient means which comprises a coil spring 28, and the coil spring 28 has one end anchored to the plate 21, while the other end of the coil spring 28 is anchored to the bracket 16.

The numeral 29 indicates an arm which has one end connected to the back rest 14 as at 30, and a pin 31 is carried by or mounted in the other end of the arm 29, and the pin 31 is adapted to selectively engage the slot 25 and notches 26. The numeral 32 indicates a stud bolt which serves to pivotally connect the arm 29 to the bracket 16. Circular washers 33 and 34 are mounted on the pin 31 as shown in the drawings.

As shown in FIG. 1, adjacent side portions of the back rests or back members 13 and 14 may be supported by simple conventional hinge assemblies 35.

From the foregoing, it is apparent that there has been provided a mechanism for use in providing a means whereby a back member such as an automobile back member 14 can be tilted or moved to different adjusted positions as desired.

With the parts arranged as shown in the drawings, it will be seen that a notch 26 in the plate 21 is adapted to receive a pin 31 on the end of the arm 29, and these notches 26 are arranged or constructed so that they define a portion of a locking mechanism whereby the back rest 14 will be maintained immobile in its adjusted or desired position. By manually gripping and moving the lever or handle 27, the plate 21 can be moved or pivoted on its pin or securing element 22 so as to free the pin 31 from engagement with the notches, whereby the pin 31 will then be able to move through the arcuate slot 25 so that the back member 14 can be moved to its desired position, and after the back member 14 has been moved to its desired position, manual pressure on the handle 27 can be released and the coil spring 28 will urge or bias the plate 21 in a counterclockwise direction, FIG. 3, so that the pin 31 will be held in one of the notches 26 in order to prevent accidental movement of the back member 14. The back member 14 has the arm 29 connected thereto as at 30, and the arm 29 is pivotally connected to the bracket 16 by means of the stud bolt or pin 32. The bracket 16 is suitably affixed to the seat frame 12 as for example by means of the fasteners 19. The bracket has the generally L-shaped configuration so that it will snugly conform to the rear corner of the seat frame in order to provide a firm mounting for the mechanism 15 of the present invention. The mechanism 15 is especially suitable for use with the part of the back member 14 as shown in FIG. 1, while the other or inner side of the back member 14 may be suitably supported by a conventional hinge joint 35. The back member 14 may be arranged for use with the front seat 10 of an automobile or other vehicle, and the back member 13 may be the back member which is used by the driver of the vehicle, while the back member 14 is located at the point where a passenger sitting alongside the driver usually sits. With the present invention a back member such as the back member 14 can be adjusted so that it is in a generally vertical position as shown in FIG. 1, or else as shown in FIG. 3 for example the back member 14 can be moved to an inclined position or to a generally horizontal position or to any of a plurality of intermediate positions so that for example the back member 14 can be arranged in a generally horizontal position in order to coact with seat 10 to provide a convenient reclining bed-like assembly which will permit the vehicle to be used with greater comfort and for various purposes.

The washers 33 and 34 help insure that the parts will be maintained in proper aligned position as they are moved or adjusted. A spacer member 23 helps maintain the plate 21 in spaced parallel relation with respect to the support member 20 so that as previously stated the plate 21 can be pivoted about an axis extending through the securing element 22 when desired.

The parts can be made of any suitable material or in different shapes or sizes.

The present invention thus provides a mechanism for permitting conversion of automobile split seat backs to a tilting back whereby the back member 14 can be tilted back and held at several positions. It is to be noted that with the present invention the pivoting axis of the seat back 14 is changed so as to permit the seat back 14 to be tilted to several different positions and the mechanism of the present invention primarily consists of the corner bracket 16 which is adapted to be affixed to the outside corner of the seat frame, and the seat back pivot is changed from the end of the extended arm to a point 32 near the bottom of the seat back. The extended arm 29 serves as a position lever and has the pin 31 in its end which slides in the slot 25, and the notches 26 serve to hold the pin 31 in its various desired positions. The small spring 28 keeps the plate 21 urged in such a direction that accidental disengagement of the pin 31 from the notches 26 will be prevented. When changing positions, the seat back is moved forward at the top and this automatically slides the pin 31 in the slotted notched plate, and to move the seat backward, the slotted notched plate is held forward with the other hand until the desired position is reached. The present invention can be readily installed on most late model vehicles as for example by drilling several holes in the seat frame and back arm and mounting the bracket 16 on the frame.

Thus, it will be seen that according to the present invention an automobile split seat back can be converted to a tilting back so that the back can be held at various positions as desired, and it is to be noted that the pivoting axis of the seat back is changed so that it can be tilted to several different positions as desired. The slot 25 is shaped arcuately so as to permit the pin 31 to move through the slot as for example when the back 14 is being adjusted. The pin is adapted to anchor in the various notches in order to hold the seat back in the desired position. The large fiber washers 33 and 34 insure that the pin can readily move without binding, and suitable spacer washers also are adapted to be used for minimizing friction and preventing binding. Cotter pins can be used wherever desired or required.

It will be seen that with the present invention there has been provided a mechanism for converting conventional vehicle split front seat backs to a tilting back with several positions from vertical to almost horizontal position and primarily the mechanism consists of a slotted notched plate which is anchored to a support member, the support member is fastened to the seat frame through the medium of the bracket, and the pin on the end of the arm 29 is adapted to engage the slotted notched plate so that with the stud bolt 32, the back 14 will be caused to pivot from a different axis. The mechanism can be readily installed on most late model vehicles by drilling several openings in the seat frame and back arm and utilizing a simple extension bracket on the opposite side of the seat back.

While the present invention has been described and illustrated for use with a vehicle back rest, it is to be understood that the present invention is applicable to other types of seats or structures besides vehicle seats.

Minor changes in shape, size and rearrangement of details coming within the field of invention claimed may be resorted to in actual practice, if desired.

What is claimed is:

In a device of the character described, a vehicle seat including a main body portion and a frame, a movable back rest adjacent said seat, a tilting mechanism comprising an L-shaped bracket positioned contiguous to the corner of said seat frame and secured thereto, said bracket including first and second portions which are arranged at right angles with respect to each other, a vertically disposed support member secured to the outer surface of the first portion of said bracket, a plate arranged in spaced parallel relation with respect to said support member, a securing element pivotally connecting a lower corner portion of said plate to said support member, a spacer member on said securing element and said spacer member being interposed between said plate and support member, said plate being provided with an arcuate slot therein, there being a plurality of spaced apart notches in said plate communicating with said slot, a handle affixed to said plate, a coil spring extending between said bracket and plate, an arm having one end affixed to said back rest, a stud bolt pivotally connecting said arm to said bracket, and a pin mounted in the free end of said arm, and said pin adapted to engage said slot and notches.

References Cited in the file of this patent

UNITED STATES PATENTS

| | | |
|---|---|---|
| 2,177,408 | Haslup | Oct. 24, 1939 |
| 2,257,156 | Clarke et al. | Sept. 30, 1941 |
| 2,809,691 | Norwood et al. | Oct. 15, 1957 |